CODE TO CODE CONVERTERS

Filed July 13, 1962

INVENTOR
LEON GRYK

BY Thomas S. Ross
Joseph R. Spalla
ATTORNEYS

United States Patent Office 3,201,780
Patented Aug. 17, 1965

3,201,780
CODE TO CODE CONVERTERS

Leon Gryk, New Britain, Conn., assignor to Royal McBee Corporation, New York, N.Y., a corporation of New York Filed July 13, 1962, Ser. No. 209,598
1 Claim. (Cl. 340—347)

Figure 1:
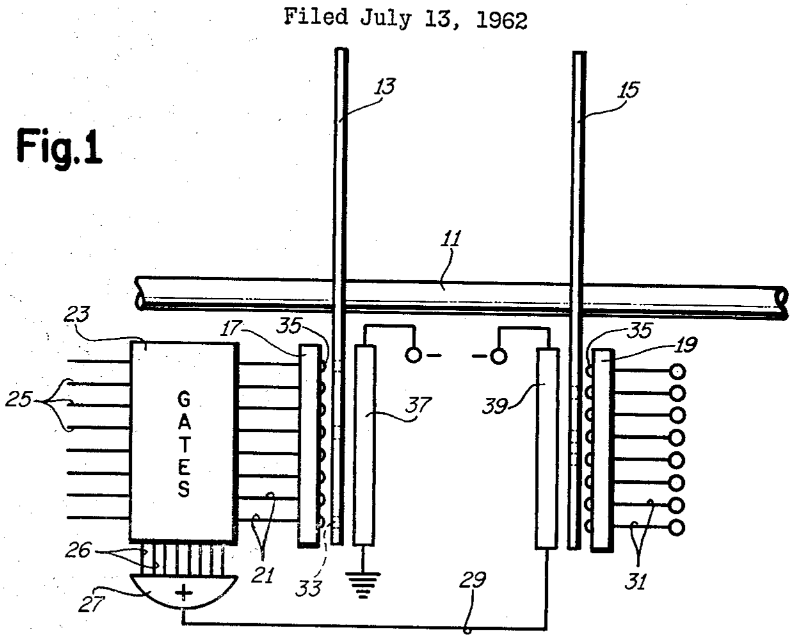

This invention relates to code to code converters; more particularly it relates to apparatus for converting $n$ digit codes defining information in accordance with a first system code assignment into $m$ digit codes defining the same information in accordance with a second system code assignment, wherein $m$ is less than, equal to or greater than $n$.

Heretofore the conversion of first system codes into second system codes, both of which represent the same information has required the decoding of first system codes into discrete signals and then the re-encoding of the discrete signals into second system codes. Such schemes require numerous elements and connections and are relatively expensive.

In accordance with the present invention conversion is effected in a very facile manner by recording first system codes on a first medium and second system codes representing the same information on a second medium. Both mediums are driven by a common source whereby transducers associated with each medium are always reading codes corresponding to the same information. In operation first system codes to be converted are compared with first system codes read from said first medium and upon coincidence the transducer associated with the second medium is caused to read out the corresponding second system code.

As is apparent from the above, the apparatus is in effect a digital to analogue to digital converter wherein a signal corresponding to a discrete position (analogue) of a first medium carrying a digital information is generated upon coincidence therewith of input digital information and wherein the signal effects the generation of digital information carried by a second medium at the corresponding discrete position on the second medium. Accordingly it is an object of the invention to provide a digital to analogue to digital apparatus for effecting code conversions in a facile manner.

Another object of the invention is in the provision of a code to code converter having a minimum of components capable of being easily fabricated and assembled.

A further object of the invention is in the provision of a code to code converter which is versatile in that it is susceptible of converting any $n$ digit code to any $m$ digit code where $m$ is less than, equal to, or greater than $n$ by the simple expedient of changing mediums on which are recorded said $n$ and $m$ digit codes.

Figure 2:
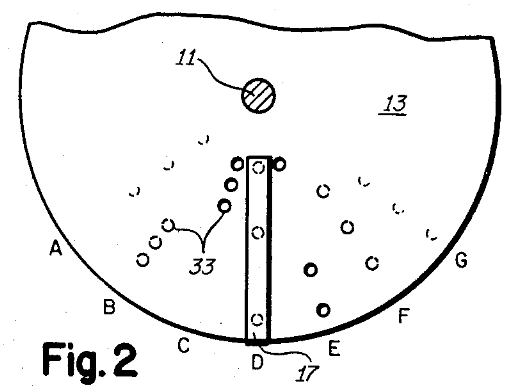
Figure 3:
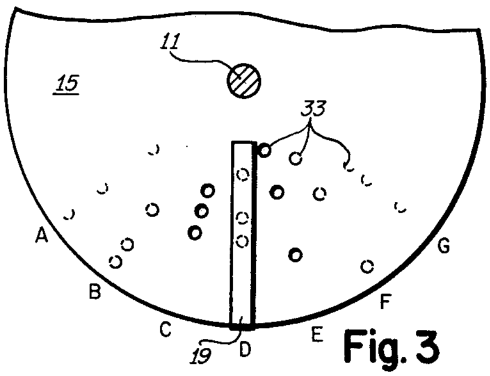
Figure 4:
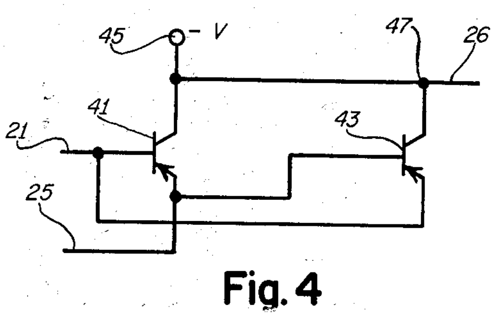

Other objects and many of the attendant advantages of this invention will be readily appreciated as the same becomes better understood by reference to the following detailed description when considered in connection with the accommpanying drawings in which like reference numerals designate like parts throughout the figures thereof and wherein:

FIGURE 1 is a block schematic view showing a code to code converter;

FIGURES 2 and 3 shown one form of medium on which first and second system codes respectively are recorded; and FIGURE 4 shows a bit coincidence detector circuit.

Referring now to the drawings which illustrate a preferred embodiment and wherein like reference characters designate like or corresponding parts throughout the several views thereof there is shown in FIGURE 1 a shaft 11 adapted to be driven at a predetermined constant rate from any suitable motive source.

The shaft 11 has secured for rotation therewith discs 13 and 15 respectively on which are recorded first and second system codes as illustrated in FIGURES 2 and 3. Associated with code discs 13 and 15 are transducer assemblies 17 and 19. The bit lines 21 from the transducer assembly 17 are connected to coincidence gate circuitry 23 together with bit lines 25 carrying first system signal combinations to be converted. The output lines 26 from the coincidence circuitry are connected to an AND gate 27 whose output line 29 is adapted to energize transducer assembly 19 when the bit signals on lines 21 and 25 coincide, whereby bit lines 31 adapted to carry signals representing a second system code corresponding to the same information represented by the code on lines 25 are energized.

With reference to FIGURES 2 and 3 the recorded radially disposed first and second system codes may take the form of conductive and nonconductive, magnetized and nonmagnetized, openings and no openings, etc., to represent the presence and absence of a bit in a particular bit level and depending on the form of coding therefore the transducer assemblies will comprise either brush assemblies, magnetic transducer assemblies or photo electric transducer assemblies respectively. In the photoelectric embodiment illustrated the presence or absence of a bit in a radial disposed code combination is represented respectively by the presence or absence of a hole 33 in the discs which in this form would be of opaque material. Alternatively the codes could be perforated in sheets adapted to be removably mounted on the face of the discs, which in this alternative form would be transparent, for facilitating changing codes.

Associated with each code level of a radial code grouping is a photoelectric sensing device 35, e.g., a photoconductive cell adapted to respond to light passing through associated holes 33 in the discs thereby generating signals on associated bit lines 21 and 31. The light source 37 associated with disc 13 is adapted to be continuously energized while the light source 39 associated with disc 15 is adapted to be energized only when the output of AND gate 37 is true or positive.

As is evident from FIGURE 2 the transducer assemblies are so positioned that each always reads a code representative of the same information.

Referring to FIGURE 4 there is shown a bit coincidence detector; it being understood that there are as many coincidence detectors as there are bits in a code combination. Each of the bit coincidence detectors comprises a pair of transistors 41 and 43 whose collectors are connected to a common negative supply source 45. Each bit signal line 21 is connected to the base of transistor 41 and to the emitter of transistor 43 of an associated detector, while each bit signal line 25 is connected to the emitter of transistor 41 and the base of transistor 43 respectively. The output line 26 of each detector which is connected to the common collector terminal 47 will be negative or true if neither transistor is conductive and positive if either is conductive. One or the other transistor will be conductive where the bit signals on associated lines 21 and 25 differ; neither will be conductive where the bit signal levels are the same.

In operation shaft 11 will be rotated at constant speed, source 37 will be on and recorded bit signals will be generated on lines 21 as the disc 13 rotates. These signals are compared with bit signals on lines 25 and when each bit compares the same, i.e., both present or both absent, the AND gate 27 output will go positive thereby pulsing light source 39 whereby transducer assembly 19 will generate second code signals on lines 31 representative on the character defined by the first system code signals on lines 25.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

Apparatus for converting first system parallel digit binary codes into corresponding second system parallel digit binary codes comprising a continuously driven shaft, first and second discs mounted for rotation with said shaft, said first and second discs having perforated therein on equi-angularly spaced radial lines all of said first and all of corresponding second system code patterns respectively, corresponding first and second system code patterns being oriented at the same relative locations on said discs, a light source on one side and a transducer assembly comprising photosensitive bit detectors on the other side of each of said discs positioned to simultaneously sense corresponding code patterns, said light source associated with said first system code disc continuously energized whereby bit signal patterns corresponding to said recorded first system code patterns are continually serially generated, bit coincidence gate means, means for applying a first system code signal pattern to be converted and first system code signal patterns generated by the transducer assembly associated with said first system code disc to said gate means thereby to generate a signal over the interval of coincidence of all bits in the code patterns applied thereto, and means for applying the signal generated by said coincidence gate means to energize said light source associated with said second disc, whereby the transducer assembly associated with said second disc generates all the bits of the second system code signal pattern corresponding to the first system code signal pattern to be converted in the coincidence interval.

References Cited by the Examiner

UNITED STATES PATENTS

| | | | |
|---|---|---|---|
| 2,784,397 | 3/57 | Bransin | 340—347 |
| 2,838,745 | 6/58 | Wright | 340—347 X |
| 3,077,590 | 2/36 | Loudon | 340—347 |

MALCOLM A. MORRISON, *Primary Examiner.*